(No Model.)
W. F. SMITH.
VEHICLE WHEEL SCRAPER.
No. 560,440. Patented May 19, 1896.
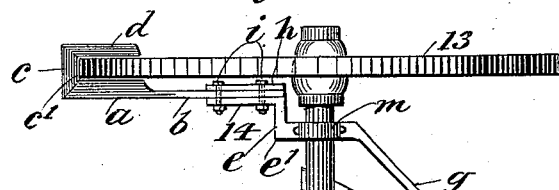
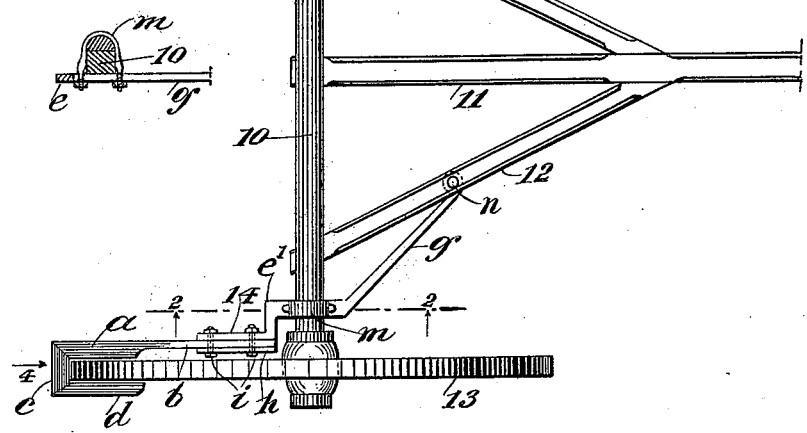
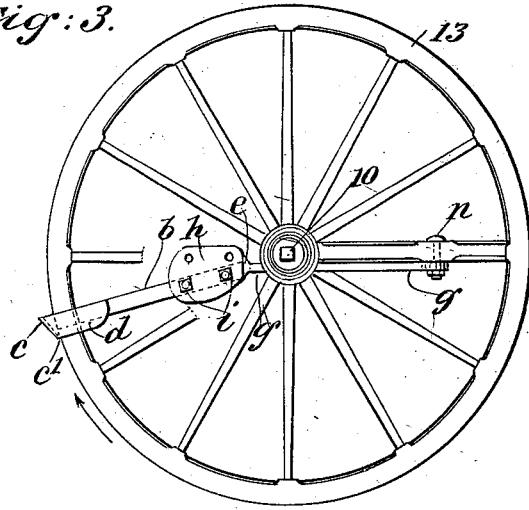
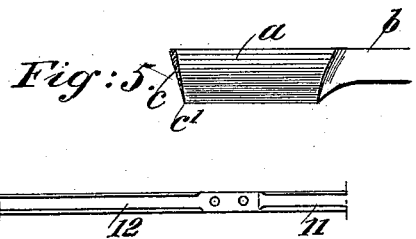
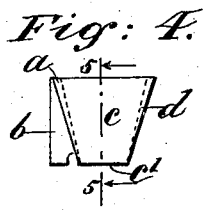
WITNESSES:
Wm L Patton
C. Sedgwick
INVENTOR
W. F. Smith
BY
Munn & Co
ATTORNEYS.

UNITED STATES PATENT OFFICE.

WILLIAM F. SMITH, OF MARQUEZ, TEXAS, ASSIGNOR OF ONE-HALF TO WILLIAM M. BROOKS, OF SAME PLACE.

VEHICLE-WHEEL SCRAPER.

SPECIFICATION forming part of Letters Patent No. 560,440, dated May 19, 1896.

Application filed September 14, 1895. Serial No. 562,518. (No model.)

*To all whom it may concern:*

Be it known that I, WILLIAM F. SMITH, of Marquez, in the county of Leon and State of Texas, have invented a new and Improved Vehicle-Wheel Scraper, of which the following is a full, clear, and exact description.

This invention relates to a novel device for removing dirt from the peripheries of vehicle-wheels while the vehicle is in motion, and has for its objects to provide a novel, simple, and very efficient device of the indicated character which is readily attachable to the running-gear of a wagon or other wheeled vehicle, which may be readily adjusted thereon to remove dirt from its wheels, which will afford a reliable guard to prevent mud and slush from being thrown by the wheels on the body of the vehicle, and that may be conveniently removed from the vehicle when the improved scrapers are not needed for service.

The invention consists in the novel construction and combination of parts, as is hereinafter described, and indicated in the claim.

Reference is to be had to the accompanying drawings, forming a part of this specification, in which similar characters of reference indicate corresponding parts in all the views.

Figure 1 is a plan view of the rear portion of the running-gear of a vehicle and the improvements thereon in position for service. Fig. 2 is a transverse sectional view of details of the improved scraper device essentially on the line 2 2 in Fig. 1. Fig. 3 is a side view of parts shown in Fig. 1, the rear wheel represented being broken away to expose parts of the improved scraper. Fig. 4 is an end elevation of one of the improved scrapers, seen in direction of arrow 4 in Fig. 1; and Fig. 5 is an enlarged longitudinal sectional view of one of the scrapers, substantially on the line 5 5 in Fig. 4.

The improvements are adapted for use on draft-wagons or lighter vehicles used for personal conveyance, and to illustrate its application the novel scrapers are shown connected with the rear portion of a heavy vehicle running-gear, of which 10 is the axle, 11 the reach, 12 are diagonal braces that extend from the axle to the reach, and 13 are the hind wheels of the vehicle, all of said parts being of ordinary construction.

The improvements consist in part of a scraper device for each wheel of the vehicle, which scraper is preferably constructed as shown, comprising a thin metal bar bent sidewise to produce a laterally-inclined scraper-blade $a$ on a straight flat arm $b$. A transverse scraper-blade $c$ is formed at a right angle to the blade $a$, and the blade $c$ is slightly longer than the width of the face of the tire on the wheel 13, terminating in an essentially horizontal scraper member $d$, that extends therefrom at a right angle substantially parallel with the scraper member $a$ at the upper edges of said scraper-blades.

As shown in Fig. 4, the scraper members $a$ and $d$ are flared or caused to diverge from each other outwardly and upwardly from their comparatively sharp lower edges, and the transverse blade portion $c$ in a like manner inclines upwardly and outwardly from its sharpened lower edge $c'$. A sufficient length is afforded the arm $b$ to permit it to serve as a support for the scraper device, holding it in proper position around the periphery of the vehicle-wheel when said arm is clamped to a scraper-holder that projects from the axle 10 of the running-gear.

As shown, the preferred means for supporting each scraper in position so that the scraper-blade $c$ will nearly contact with the face of the wheel-tire and the other members $a$ $d$ nearly touch the sides of the wheel-rim and spokes of the wagon-wheel near said rim, and thus be adapted to remove dirt from the wheel as it moves toward the scraper or in the direction of the curved arrow in Fig. 3, consists of a clamping-box 14 and an arm therefor. The clamping-box mentioned is composed of a flat plate of suitable dimensions, having an arm $e$ projected from its edge substantially at a right angle, as clearly indicated in Fig. 1. The laterally-bent arm $e$ is again bent at $e'$ to project rearwardly below the axle 10, and the arm $g$ thus afforded is secured to the axle, preferably by the clip-band $m$. From the axle the arm $g$ extends toward the adjacent brace 12 of the vehicle-gear, and is thereto secured by a bolt $n$ or other means, if preferred. The clamping-box 14 is completed by providing a flat plate $h$, that is held in clamping connection with the stationary plate or portion of the clamp by spaced bolts $i$, that are provided in pairs and pass through holes in the clamping-plates and also through perforations in the arm $b$, so that when nuts on said bolts are properly adjusted the arm $b$ and scraper device on its outer end will be held inclined, so as to adapt the blades $a\ c\ d$ for efficient service. The clamping-plates have other perforations which will permit the bolts $i$ to retain the scraper clamped at a different angle of projection from the clamping-plates, said holes being shown in Fig. 3. By this construction the scraper devices, when worn, may be adjusted vertically downward, so that they will engage the wheel-tires at points below and behind their original points of engagement.

It will be seen that when each wheel of a vehicle is provided with a scraper device such as described mud will be removed from the wheels as the vehicle is in motion, and also that from the form and disposition of the scrapers the blades of each scraper will be adapted to prevent liquid mud or muddy water from splashing over the body of the vehicle when the latter is drawn over a muddy road.

The scrapers and their supports are so arranged that they can be entirely removed when this is desired, or the arms $b$ and scrapers on them may be taken off the clamping devices and the latter be permitted to remain in place for the convenient replacing of the scrapers as occasion may require.

Having thus described my invention, I claim as new and desire to secure by Letters Patent—

The combination with the running-gear of a vehicle, of supporting-arms each secured at their forward ends to the reach and extending rearward and diagonally outward beyond the axle, clips carried by the said arms embracing the axle, the rear ends of said arms beyond the axle being bent parallel to the plane in which the wheel rotates and provided with clamping-boxes, and scraper devices to embrace the wheel-tire, said scraper devices being vertically adjustable in said clamping-boxes of the supporting-arms, substantially as set forth.

WILLIAM F. SMITH.

Witnesses:
   F. M. CARRINGTON,
   TOM WALTON.